No. 609,499. Patented Aug. 23, 1898.
S. & S. R. CHATWOOD.
STEAM SUPERHEATER.
(Application filed Dec. 28, 1897.)

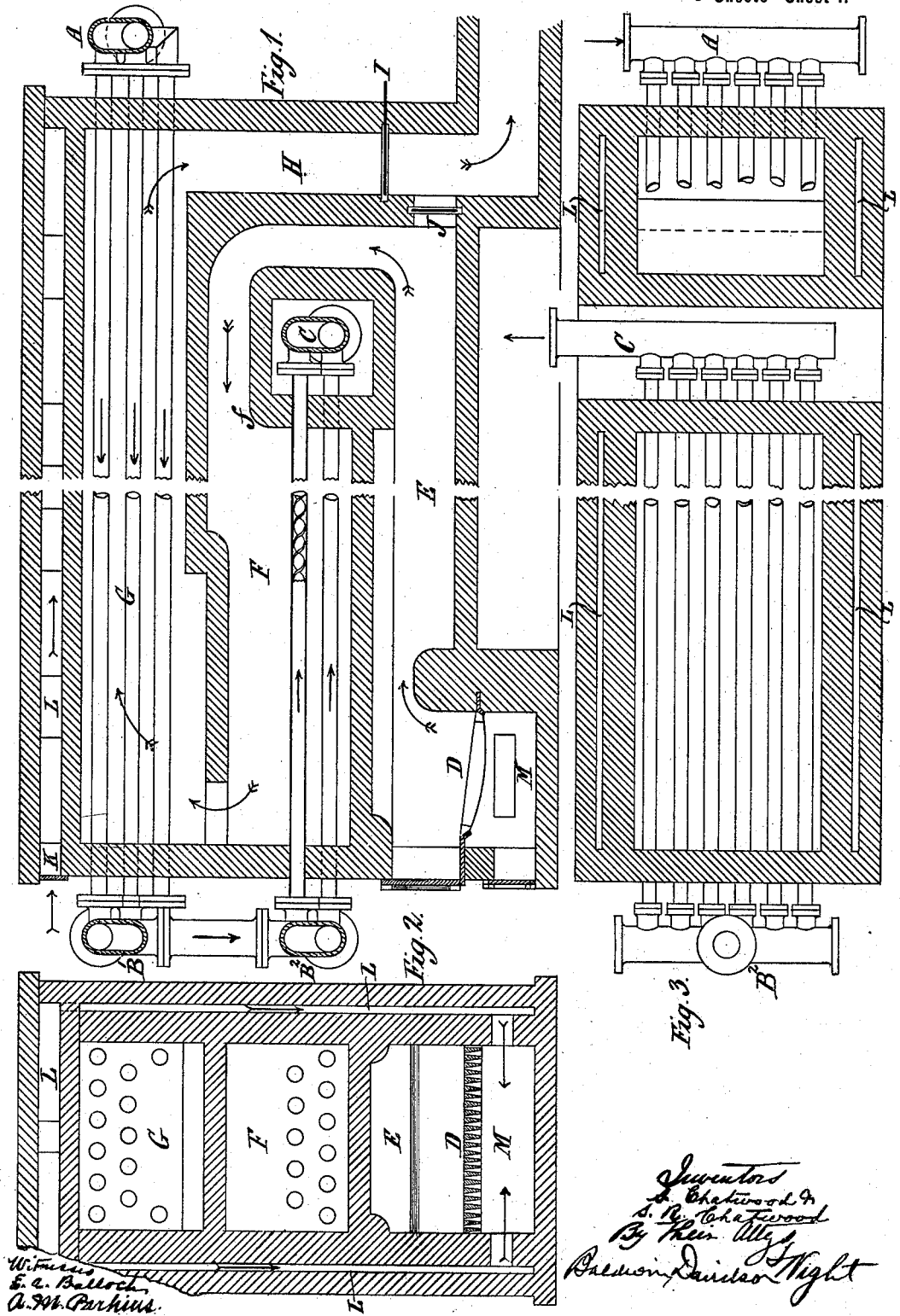

(No Model.) 5 Sheets—Sheet 2.

No. 609,499. Patented Aug. 23, 1898.
S. & S. R. CHATWOOD.
STEAM SUPERHEATER.
(Application filed Dec. 28, 1897.)

(No Model.) 5 Sheets—Sheet 3.

No. 609,499. Patented Aug. 23, 1898.
S. & S. R. CHATWOOD.
STEAM SUPERHEATER.
(Application filed Dec. 28, 1897.)
(No Model.) 5 Sheets—Sheet 4.

No. 609,499. Patented Aug. 23, 1898.
S. & S. R. CHATWOOD.
STEAM SUPERHEATER.
(Application filed Dec. 28, 1897.)
(No Model.) 5 Sheets—Sheet 5.
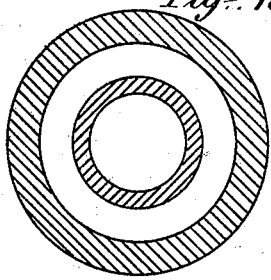
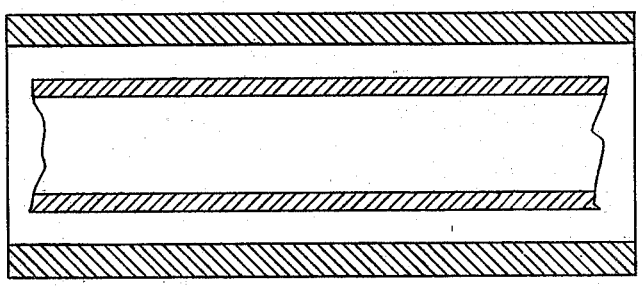
Figs. 18.
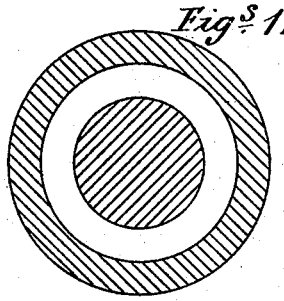
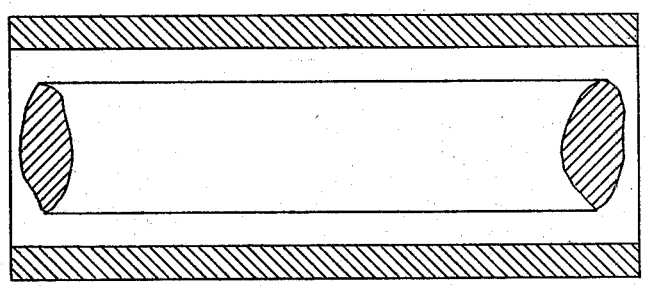
Figs. 17.
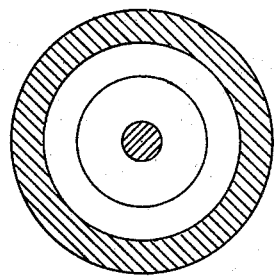
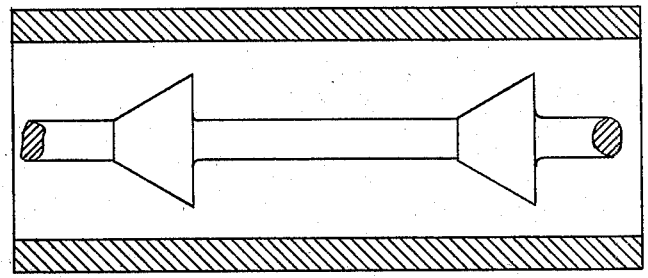
Fig. 20. Fig. 19.
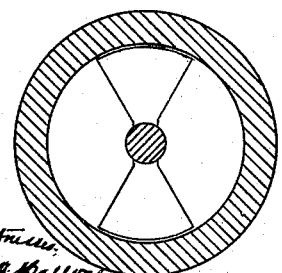
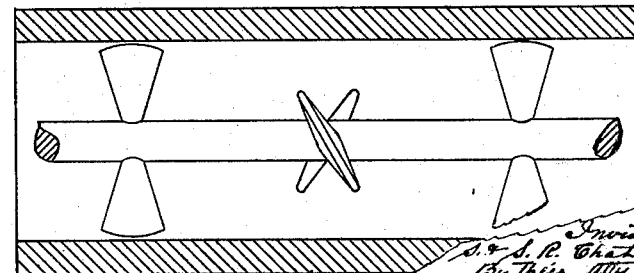
Fig. 16. Fig. 15.

UNITED STATES PATENT OFFICE.

SAMUEL CHATWOOD, OF LONDON, AND SAMUEL RAWSTHRONE CHATWOOD, OF BOLTON, ENGLAND.

STEAM-SUPERHEATER.

SPECIFICATION forming part of Letters Patent No. 609,499, dated August 23, 1898.

Application filed December 28, 1897. Serial No. 664,073. (No model.)

*To all whom it may concern:*

Be it known that we, SAMUEL CHATWOOD, bankers' engineer, residing at 76 Newgate street, in the city of London, and SAMUEL RAWSTHRONE CHATWOOD, manager, residing at the Lancashire Safe and Lock Works, Bolton, in the county of Lancaster, England, subjects of the Queen of Great Britain, have invented certain new and useful Improvements in Apparatus for Superheating Steam, of which the following is a specification.

We employ for this purpose a furnace with a fire-box at the lower part communicating, preferably, horizontally with a fire-brick chamber, which, becoming highly heated, promotes perfect combustion and prevents fluctuation of temperature. From this chamber another chamber, preferably situate above the first and above the fire-box, is entered, and this chamber again communicates at the front end by a rising passage with another preferably horizontal return-chamber, which passes from front to back, and at the back by a descending flue is connected with a chimney. In these chambers pipes are laid through which the steam to be superheated is passed. The steam-pipes traverse the two chambers lengthwise. They enter the upper chamber at the cooler end and, passing to the other end, descend, and then traverse the lower chamber from front to back. We employ for superheating the steam pipes containing within them spirally-bent metallic bars or other obstructions.

The pipes which lie in the lower pipe-heating chamber, which are more highly heated than those in the upper chamber, are protected from the direct impact of the flame and heated gases by being laid at the lower part of the chamber under shelter of a protecting wall or bridge. These portions of the pipes are heated principally by radiation from the hot brickwork forming the roof of the chamber. This precaution is taken to prevent rapid wear of the pipes arising not only from the high temperature, but also from the oxygen of the air mingled with the gases being as yet only imperfectly consumed. The pipes in the upper heating-chamber, where the temperature is lower and the gases more perfectly consumed, are fully exposed to the draft through the chamber. The shell or outer wall of the furnace is of brickwork, and in the brickwork air-passages are sometimes arranged, by which air passes to the ash-pit of the furnace. The air-current, which can be regulated by dampers, serves both to preserve the brickwork and to heat the air provided for the combustion of the fuel. The superheated steam is delivered into a storage-chamber or into passages of large capacity, which lead the steam to the engine, for we find that the heating of the steam is greatly facilitated by causing it to pass through the superheating-pipes at a high velocity, so as to be much agitated, and, conversely, that the loss of heat in the pipes conveying the steam from the superheater to the engine is reduced by the steam passing through at a low velocity, so as to be only slightly agitated.

Where the engine is compound we provide two sets of superheating-pipes in the furnace, each with its storage-chamber, and by the one set we superheat the steam before it enters the high-pressure cylinder, and by the other set we again superheat the steam in its passage from the high-pressure cylinder to the low-pressure cylinder. When two sets of superheating-pipes are thus provided, they may or may not be separated the one from the other by partitions in the heating-chambers, and if so separated dampers should be provided to direct the draft, so that the heat may be separately regulated to the two sets of pipes. Similarly in the case of triple and quadruple expansion three and four sets of superheating-pipes and storage-chambers may be provided.

In the annexed drawings, Figure 1 is a longitudinal and vertical section of a superheater in accordance with our invention. Fig. 2 is a transverse section, and Fig. 3 is a horizontal section in various planes. In this superheater the pipes are arranged horizontally. Figs. 4 and 5 are vertical sections of an upright superheater in accordance with our invention. Figs. 6 and 7 are horizontal sections of the same. Fig. 8 is a transverse vertical section of a double superheater having the same general arrangement as in Figs. 1, 2, and 3. Figs. 9 to 20 relate to the superheating-pipes and the spiral or other obstructions within them. Fig. 9 shows a longitudinal section of a pipe through which steam is passed for the purpose of heating the same. It contains within it a spirally-bent blade. Fig. 10 is a transverse section of Fig. 9. The breadth of the blade in these figures is somewhat less than the radius of the tube. Figs. 11 and 12 show similar views of a tube and spiral blade; but the breadth of the blade in this case is nearly equal to the interior diameter of the tube. Fig. 13 shows a transverse section of a tube containing a spirally-bent bar, which in place of being flat, as in the previous figures, is provided with four radial arms. Fig. 14 shows a similar view in which the bar is provided with three radial arms. Fig. 15 shows a longitudinal section of a tube provided with central rod having inclined arms fixed upon it at intervals. Fig. 16 is a transverse section of Fig. 15. Fig. 17 shows a superheating-tube containing within it a stout bar, occupying the central portion of the tube. Fig. 18 is similar to the preceding; but in this case a tube is substituted for the central bar. Figs. 19 and 20 show views similar to Figs. 15 and 16; but in these figures the central rod carries conical bosses at intervals.

In Figs. 1, 2, and 3, D is the fire-box, E is a combustion-chamber, and F is a chamber in which the tubes are heated mainly by radiation from the roof and walls. They are protected from the direct action of the flame by the bridge $f$. G is a chamber in which the tubes are heated by direct contact of the gases. H is a flue to the chimney. I and J are dampers. The damper I controls the draft through the apparatus when working. The damper J is intended to be opened during stoppages in order to pass the flame and heated gases to the chimney without their coming into contact with the tubes. K is an air-inlet through which the air for combustion enters the apparatus. It then finds its way through the cavities L to the ash-pit M. A is the header, at which the steam is admitted and by which it is distributed to the tubes. It passes through one range of tubes to the header B', which communicates with the header $B^2$, and from the header $B^2$ through another range of tubes to the header C, from which it passes to the engine.

The arrows ⟶ show the direction of the steam in passing through the apparatus.

The arrows ⟩⟶ show the direction in which the air required for combustion passes through the apparatus.

The arrows ⟩⟶ show the direction in which the flame and furnace-gases pass through.

A portion of one of the pipes in Fig. 1 is broken away to show the spirally-bent bar lying within it, or in place of employing these spirals more numerous pipes of smaller diameter may be provided.

In Figs. 4, 5, 6, and 7 the combustion-chamber E and the radiating-chamber F are combined and marked E F. The letters and arrows marked upon it have the same significance as in Figs. 1, 2, and 3.

Figure 4:
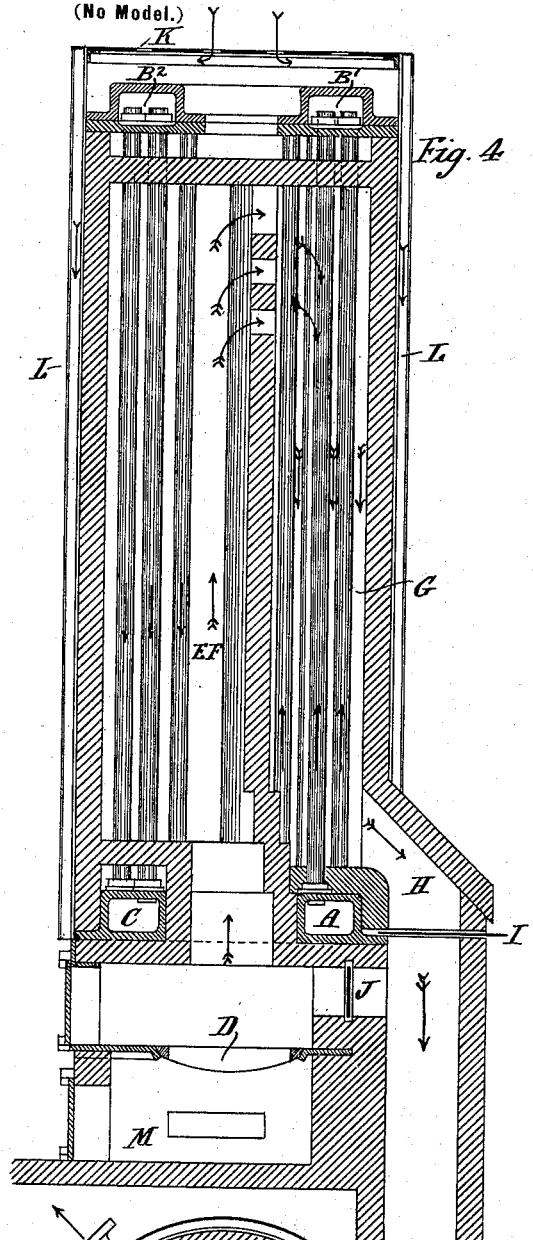
Figure 5:
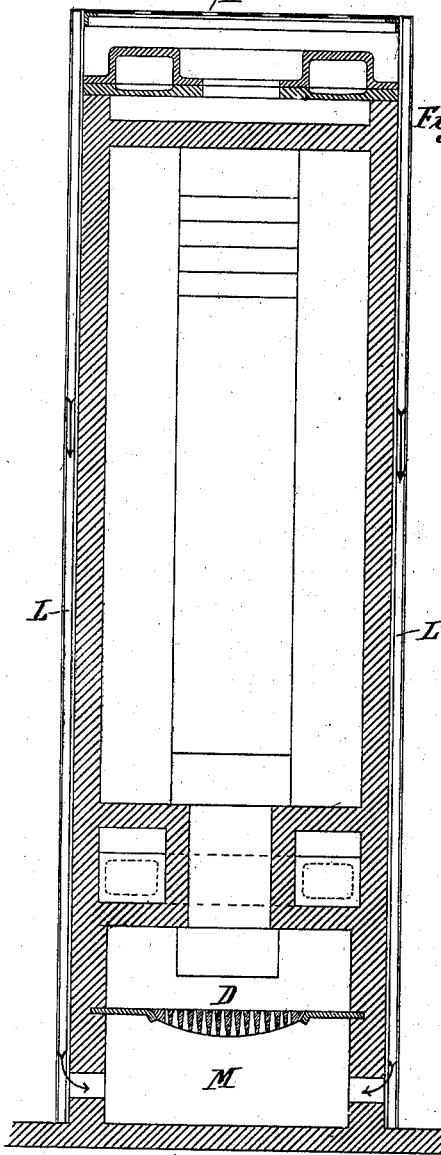
Figure 6:
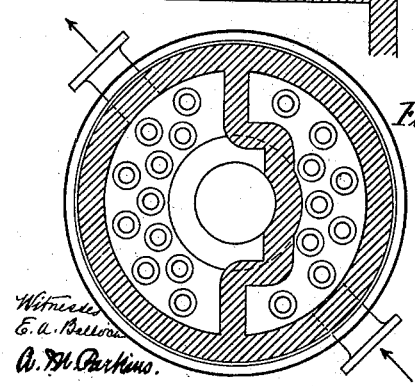
Figure 7:
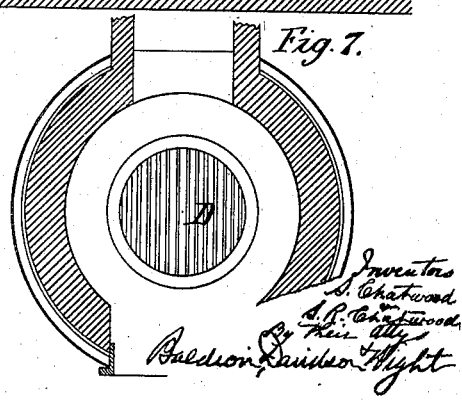
Figure 8:
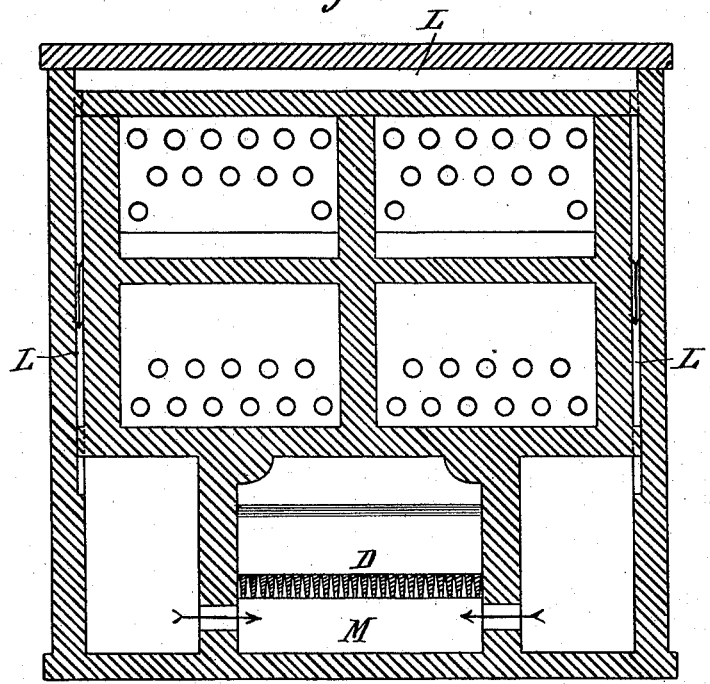
Fig. 8 is a section of a superheater similar to that shown in Figs. 1, 2, and 3, but divided by a partition N, so as to superheat the steam for a compound engine before admission to the high-pressure cylinder and again before admission to the low-pressure cylinder.
Figure 10:
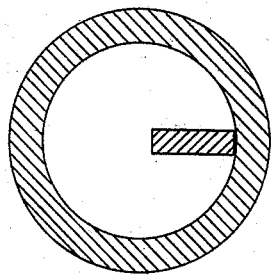
Figure 12:
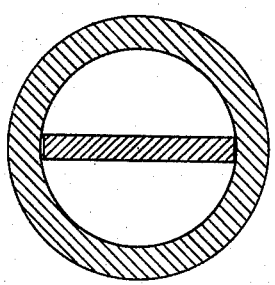
Fig. 12 is a transverse section showing another form in which the spiral bar is wider and extends diametrically from side to side in the pipe.
Figure 9:
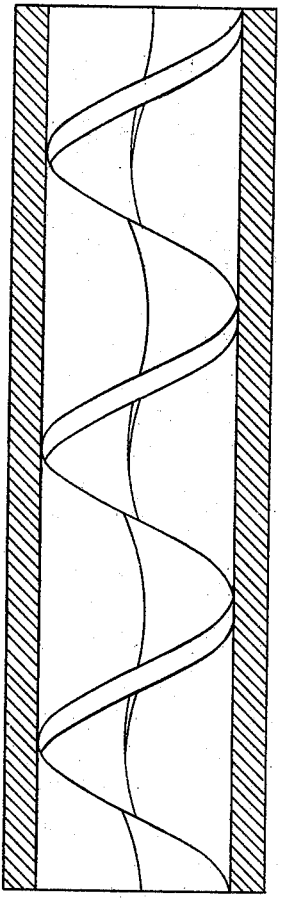
Fig. 9 is a longitudinal section, and Fig. 10 a transverse section, of a superheating-pipe containing a flat and comparatively narrow spiral bar, which occupies comparatively little space within the pipe, but which yet is very efficient in imparting rotary motion to the steam in passing through, and thereby insuring rapid motion of the steam which is in immediate contact with the wall of the pipe.
Figure 11:
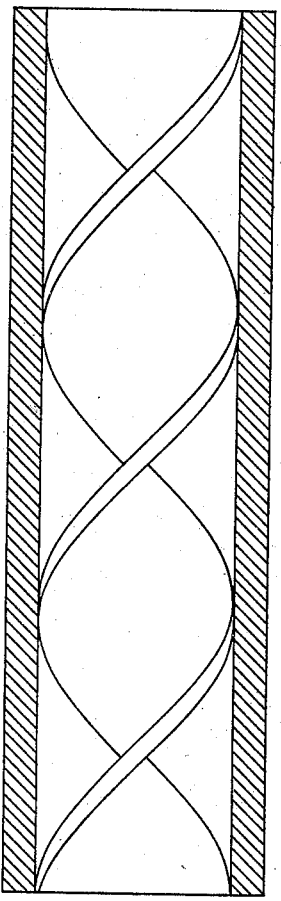
Fig. 11 is a longitudinal section.
Figure 13:
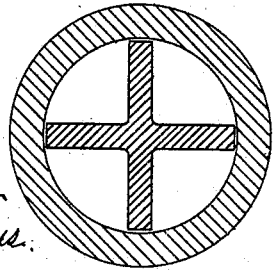
Figs. 13 and 14 show other forms. In all the object is the same, principally to impart rotary motion to the steam, and thereby insure high velocity, and to prolong the travel of the steam passing in immediate proximity to the heated walls of the pipe.
Figure 14:
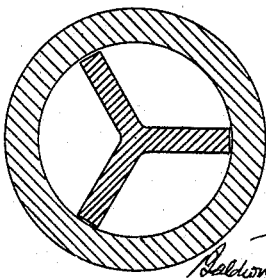

It is possible to gain some of the advantages of the above arrangemnt by putting vanes here and there in the pipes to give a spin to the steam passing them or obstructions which would cause the steam to be agitated and brought into contact with the pipes before mentioned. Thus the spiral bar need not be continuous; but short lengths of such bars may be placed at intervals within the tube, forming vanes to impart rotary movement to the steam, or vanes mounted on a rod centrally placed within the pipe may be employed. Such an arrangement is shown by Figs. 15 and 16; also, some advantage may be gained by putting in an inner bar or pipe into the superheating-pipe, thereby reducing the capacity of the pipe while maintaining the area of its outer and inner surfaces. Such arrangements are illustrated by Figs. 17 and 18, or obstructions, preferably conical, may be provided within the externally-heated pipe, as seen in Figs. 19 and 20, to mix and agitate the steam.

When we employ an inner bar within the superheating-pipe, the principal object is to narrow the channel through which the steam must pass, and thereby to bring it into closer proximity to the heated walls. It is preferred to employ a cylindrical bar and to cause it to occupy a central position within the pipe by suitably supporting it at intervals.

We claim—

1. In a superheater, the combination of a fire-box, three superposed fire-brick chambers arranged one over the other and through which the products of combustion pass successively, superheating-pipes arranged horizontally in the two upper chambers, a passage connecting the lower chamber with the middle one for conducting the products of combustion through the chambers in such manner that they shall not come directly in contact with the superheating-pipes, a passage for conducting products of combustion from the middle chamber into the upper one in such manner as to cause them to come into contact with the pipes therein, pipe connections for admitting steam to the pipes at that end of the pipes opposite the end through which the products of combustion are admitted and pipe connections for conducting away the steam from the pipes in the lower chamber at the end nearest the entrance end of the chamber for the admission of the products of combustion.

2. Superheating apparatus comprising a fire-box, two chambers through which products of combustion from the fire-box successively pass, superheating-pipes arranged in said chambers, pipe connections for causing the steam to pass through said pipes in the opposite direction to that in which the products of combustion pass, and spirally-twisted blades arranged in said superheating-pipes.

SAMUEL CHATWOOD.
SAMUEL RAWSTHRONE CHATWOOD.

Witnesses:
R. CECIL WINDER,
FRED. J. BROWN.